United States Patent [19]

Usui

[11] 4,317,267

[45] Mar. 2, 1982

[54] METHOD FOR MAKING VALVE MOVING PUSH ROD FOR INTERNAL COMBUSTION ENGINES

[75] Inventor: Masayoshi Usui, Numazu, Japan

[73] Assignee: Usui Kokusai Sangyo, K.K., Japan

[21] Appl. No.: 136,357

[22] Filed: Apr. 1, 1980

Related U.S. Application Data

[62] Division of Ser. No. 944,018, Sep. 20, 1978, Pat. No. 4,218,996.

[51] Int. Cl.$^3$ .................. B23P 15/00; B23K 11/02
[52] U.S. Cl. ...................... 29/156.7 B; 219/67; 219/78.13; 219/117.1
[58] Field of Search .............. 29/156.7 B, 156.7 R, 29/156.5 A; 219/67, 78.13, 117.1; 148/127, 154; 123/90.61; 74/579 R; 228/231

[56] References Cited

U.S. PATENT DOCUMENTS

| | | | |
|---|---|---|---|
| 1,252,144 | 1/1918 | Murray | 148/127 |
| 2,162,229 | 6/1939 | Remington | 148/127 |
| 2,262,705 | 11/1941 | Tuttle | 148/127 |
| 2,960,080 | 11/1960 | Burnard et al. | 123/90 |
| 2,975,775 | 3/1961 | Macura | 123/90 |
| 3,066,658 | 12/1962 | Gondek | 123/90.61 |
| 3,094,107 | 6/1963 | Gondek | 123/90.61 |
| 3,101,402 | 8/1963 | Gondek | 29/156.5 A |
| 3,191,290 | 6/1965 | Knox | 123/90.61 |
| 3,549,853 | 12/1970 | Guido | 29/156.7 B |
| 3,857,013 | 12/1974 | Niesse | 219/117.1 |

OTHER PUBLICATIONS

Metals Handbook, "Welding and Brazing," American Society for Metals, Metals Park, Ohio, 1971, vol. 6, 8th Edition, pp. 414, 415.

Gillette, R. T., "Resistance-Welding Laboratory Facilities," from *General Electric Review*, Jul. 1945, pp. 26–29.

*Primary Examiner*—Daniel C. Crane
*Attorney, Agent, or Firm*—Anthony J. Casella

[57] ABSTRACT

This invention is made with a view to increasing the fusing strength of an end piece in a valve moving push rod for internal combustion engines. The fusing part of the push rod according to the present invention consists of an α-martensite structure and a primary truestite structure in a cotransition boundary range of a segmental section formed into the hardened layer of the end piece from the fused boundary surface of the end piece with a tube end part and is provided with a tough mixed layer arcuated from the inside end part of the above mentioned fused boundary surface to the outside end part thereof. This mixed layer is obtained by reducing by a heat feeding means a quick temperature drop caused by the fusing part simultaneously with cutting off the fusing current in welding by electric resistance the end piece on the fixed side surface to the peripheral edge of the end port of a tube material. Such crack as is recognized in the fusing part of a conventional product is not recognized in a product obtained by reducing the quick cooling by this method.

1 Claim, 4 Drawing Figures

METHOD FOR MAKING VALVE MOVING PUSH ROD FOR INTERNAL COMBUSTION ENGINES

This is a division of application Ser. No. 944,018, filed Sept. 20, 1978 now U.S. Pat. No. 4,218,996, issued Aug. 26, 1980.

BACKGROUND OF THE INVENTION

1. Field of the Invention

This invention relates to a valve moving push rod for internal combustion engines obtained by improving the fusing strength of an end piece and to a method of making the same.

2. Description of the Prior Art

A conventional push rod of this kind is obtained solely by welding by an electric resistance welding method an end piece having the end surface formed to be a concave or convex arcuate surface and having a carbon-hardened layer formed on the peripheral wall surface to the peripheral edge of a port at one or each end of a steel tube material. The arts as above described have been proposed by, for example, U.S. Pat. Nos. 2,975,775 and 2,960,080. However, according to these prior arts, the end piece accidentally drops sometimes during the operation of the engine.

SUMMARY OF THE INVENTION

The present invention is made to solve such problem. Its subject matter shall be explained with reference to the drawings in the following.

DETAILED DESCRIPTION OF PREFERRED EMBODIMENTS

Figure 1:
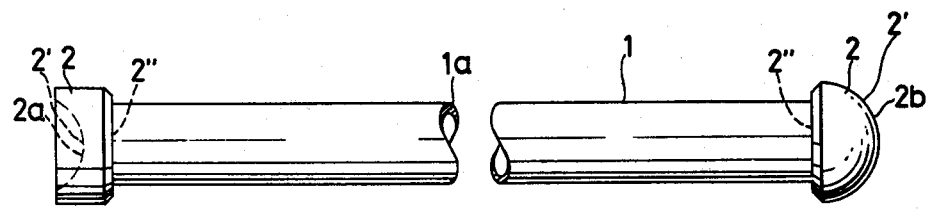
FIG. 1 is an elevation showing an embodiment of the push rod according to the present invention.
Figure 2:
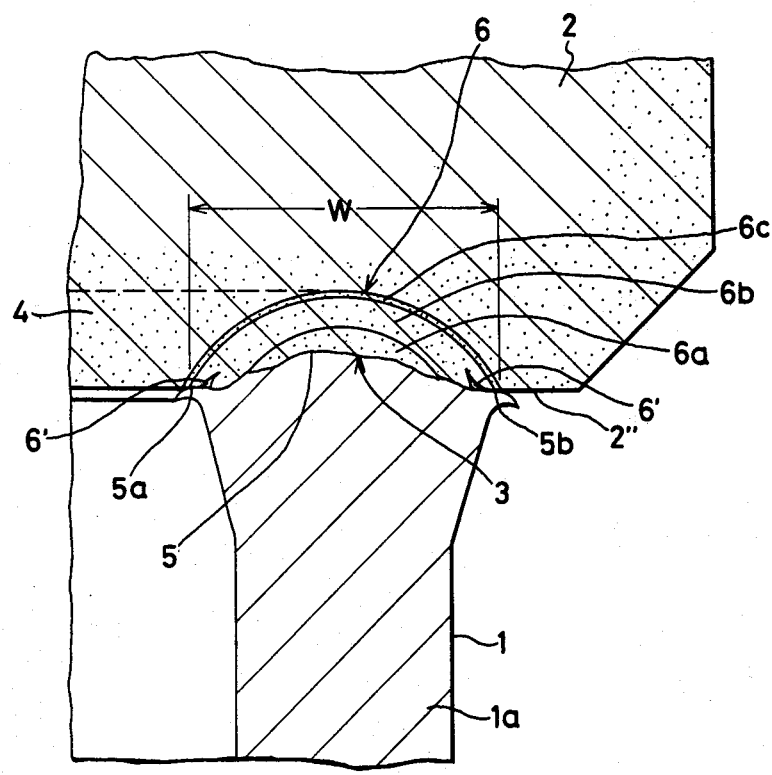
FIG. 2 is a magnified sectioned view of a part of the same.

In FIGS. 1 and 2, reference numeral 1 indicates a steel tube material and 2 indicates an end piece having the end surface 2' formed to be a concave arcuate surface 2a or a convex arcuate surface 2b and having the fixing side surface 2" made flat 2c. Said piece 2 is welded by electric resistance to the peripheral edge 1a' of the port at the end of the steel tube material 1. The one illustrated in FIG. 1 has at one end an end piece having the end surface 2' formed to be a concave arcuate surface 2a and is provided at the other end with an end piece of a convex arcuate surface 2b.

FIG. 2 shows a main formation of the present invention. Therein reference numeral 4 indicates a carbon-hardened layer consisting of a $\beta$-martensite structure formed by carbon-hardening on the peripheral wall of the end piece 2. Reference numeral 5 indicates a fusing boundary surface. Said boundary surface 5 is formed to be annular along the periphery of the port at the end of the tube on the fixed side surface 2" of the end piece by the above mentioned electric resistance welding. Reference numeral 6 indicates a cotransistion boundary range formed by the transition of the above mentioned hardened layer structure at the time of welding, expanding in a segmental section into the hardened layer 4 from the fusing boundary surface 5 and made annular along the fusing boundary surface 5. This cotransition boundary range 6 segmental in the section consists of structure layers formed in the order of 6a, 6b and 6c in turn into the hardened layer from the fusing boundary surface 5 side. Reference numeral 6a indicates a very hard brittle $\alpha$-martensite layer of a hardness Hv of 750 to 800 formed to be segmental in the section on the intermediate part of the fusing boundary surface 5 and made annular along the fusing boundary surface. 6b indicates a tough layer of a hardness Hv of 450 to 550 consisting of a mixed structure of an $\alpha$-martensite and primary truesite, arcuated over the outside end part 5b from the inside end part 5a of the above mentioned fusing boundary surface 5 and made annular along the fusing boundary surface the same as the above mentioned layer 6a. 6c indicates a thin layer consisting of a tough secondary truestite structure of Hv=480 present between said mixed layer 6b and the above mentioned hardened layer 4. Numeral 6' indicates a notch-shaped recess part formed in the inside end part or outside end part of the cotransition boundary range 6 by pressing at the time of the resistance welding.

Figure 3:
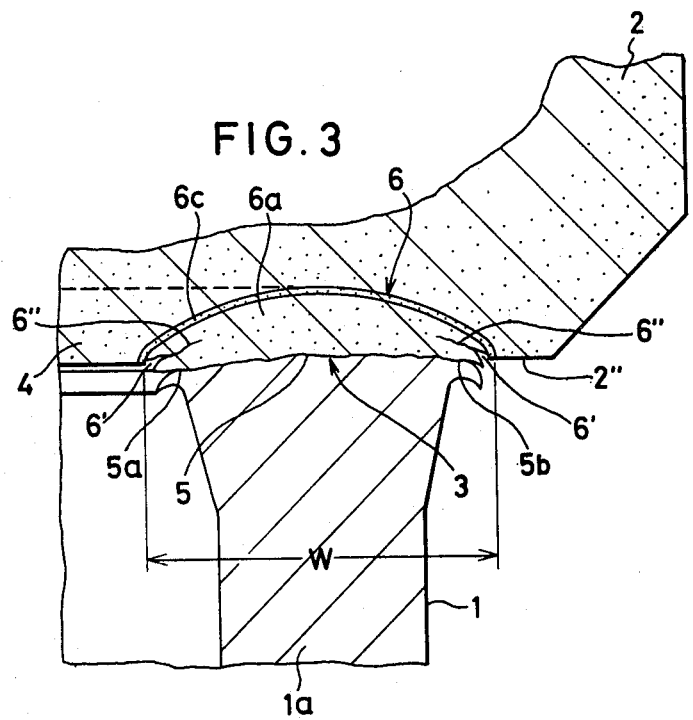
FIG. 3 is a magnified sectioned view of a part of a conventional product, showing a section corresponding to that in FIG. 2. The elevation of this conventional product appears the same as in FIG. 1 and shall be therefore omitted.

If the section structure in the fusing part illustrated in the above mentioned FIG. 2 showing the formation of the present invention is compared with the section structure illustrated in FIG. 3 of the conventional product, it will be found that, according to the present invention, the end piece 2 and the end part of the tube material are fused together through the tough mixed layer 6b, whereas, in the fusing part 3 of the conventional product, no such tough mixed layer 6b is present but the brittle $\alpha$-martensite layer 6a which is very high in the hardness is made a fusing layer and therefore that the push rod according to the present invention is formed to be stronger in the end piece fusing part than the conventional product.

Figure 4:
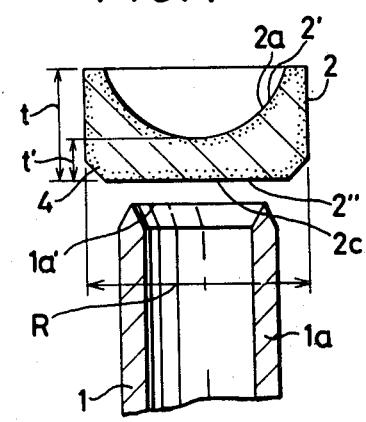
FIG. 4 shows vertically sectioned views of each embodiment of the end piece and end part of a steel tube material welded by electric resistance. In the drawing the same reference numerals respectively indicate the same or corresponding parts.

In both cases of the product of the present invention and the conventional product, the valve moving push rod is made by bringing the peripheral edge 1a' of the port at the end of the steel tube material into contact with the fixed side surface 2" of the end piece as illustrated in FIG. 4 and resistance-welding them by instantaneously passing a high current as a fusing current through them but the cooling method after cutting off the current is different. The conventional product is obtained by natural air-cooling but such fusing part 3 on the end piece side as is obtained by air-cooling consists of an $\alpha$-martensite layer as illustrated in FIG. 3, is hard and brittle and can not have the presence of fine cracks 6" prevented. When a high current is instantaneously passed at the room temperature at the time of welding, the temperature of the welding part 3 will instantaneously reach about 1400° C. but will instantaneously drop to be below 1000° C. and will further continue to drop so quickly that the generation of the cracks will be unavoidable at the time of such quick cooling. The cracks will be generated between 900° and 100° C. at the time of quick cooling and will be likely to be generated by quick cooling particularly near 700° and 250° C.

In the valve moving push rod welding step, the velocity near 250° C. is reduced by the residual heat of the chuck which is also an electrode and of the push rod bur no means of reducing the quick cooling of the high temperature produced in the fusing part by instantaneously passing a high current is known.

The present inventor has made the present invention by confirming that, if the quick cooling of the high temperature in such fusing part 3 is reduced by feeding heat to said fusing part simultaneously with cutting off the fusing current, not only the generation of the cracks will be prevented but also the structure formed within the above mentioned cotransition boundary range 6 will be the tough mixed structure 6b not seen in the conventional product. As the heat feeding means made by the present inventor, there can be enumerated a method wherein the peripheral edge 1a' of the port at the end of the tube is brought into contact with the fixed side surface of the end piece, a fusing current is instantaneously passed while gas-heating said contact part to a proper temperature and then the gas-heating is gradually stopped, a method wherein the contact part is high frequency-heated simultaneously with cutting off the welding current and a method wherein a current of a proper intensity is instantaneously synchronously passed simultaneously with cutting off the welding current. Here heat is generated by synchronously passing a current because the cooling after the fusing current is cut off is so quick as is mentioned above.

The notch-shaped recess part 6' shown in FIGS. 2 and 3 is produced by pressing applied by the electrode at the time of fusing. Reference numeral 6" indicates a crack likely to be produced on the peripheral side of the notch-shaped part. The generation of such cracks 6" can be well prevented by reducing the quick cooling by the above described heat feeding means. If the expansion W of the cotransition boundary range 6 toward both inside and outside of the tube wall 1a is limited to be within the fusing boundary surface 5 as illustrated in FIG. 2, the gradually cooling action will be made more favorably. Such manner is different depending on the selection of the quick cooling reducing means, the state of the peripheral edge 1a' of the port at the end of the tube and the control of the pressing force. Therefore, the favorable conditions in the operation are experimentally determined.

FIG. 3 shows that the expansion W of the cotransition boundary range 6 consisting of a hard, brittle and most undesirable α-martensite structure projects outward of both inside and outside end parts 5a and 5b of the fusing boundary surface 5 to produce the crack 6" at the tip of each notch-shaped recess part 6'.

An example of working the present invention is shown in the following to clarify the manner of reducing the quick cooling by a heat feeding means and the obtained effects.

Manufacturing Manner

A steel tube material 1 of ASTM A512-66 MT1010, a tube diameter of 8.0 mm, thickness of 1.2 mm and length of 186.0 mm was borne in the end part with a chuck, an end piece 2 of ASTM A-575-73 G10120, a carbon-hardened depth of 0.6 mm (full cementation), surface hardness Hv of 700, outside diameter R of 10.5 mm, thickness t of 10 mm and bottom thickness t' of 5 mm having the end surface 2" made a flat surface was mounted on the peripheral edge 1a' of the port at the tube end of the above mentioned steel tube material 1, then a welding current of a voltage of 8 volts, 50 cycles and an intensity of 16,000 A/cm$^2$ was passed through them under a pressing force of 1,100 kg for 2/100 second, then a current of the same voltage and cycles and 4,500 A/cm$^2$ was synchronously passed as a gradually cooling means under the same pressure for 6/100 second simultaneous with cutting off the current to reduce the quick cooling and then they were naturally air-cooled to obtain an expected product.

Preparation of Samples

The above mentioned manner was repeated to obtain 50 expected products. 13 samples were indiscriminately taken out of them. 3 of the samples were subjected to the section test of the fusing part and the remaining 10 were subjected to the test of the fusing strength.

Test Results

In the section of the obtained sample, as illustrated in FIG. 2, said expansion W of the cotransition boundary range 6 being within the fusing boundary surface 5, and a taugh mixed layer 6b having notch-shaped recess parts 6', accuated over outside end part 5b from inside end part 5a of the fusing boundary surface 5 were observed within said cotransition boundary range 6. The results of the strength test of the fusing part 3 were as mentioned in Table 1.

By the way, in the table, the sample of the conventional product was obtained in exactly the same manner except that no heat feeding means was applied to reduce the cooling in the above mentioned manner of making the product of the present invention. This heat feeding means is a means of synchronously passing an electric current of 4,500 A/cm$^2$ for 6/100 second as mentioned in the above mentioned manufacturing manner.

TABLE 1

| Product of the present invention | | | | Conventional product | | | |
|---|---|---|---|---|---|---|---|
| No. | Strength | No. | Strength | No. | Strength | No. | Strength |
| 1 | 1200kg | 6 | 1230kg | 1 | 1060kg | 6 | 820kg |
| 2 | 1210 | 7 | 1200 | 2 | 1120 | 7 | 1030 |
| 3 | 1220 | 8 | 1140 | 3 | 860 | 8 | 970 |
| 4 | 1160 | 9 | 1250 | 4 | 1030 | 9 | 1010 |
| 5 | 1180 | 10 | 1210 | 5 | 1080 | 10 | 890 |
| | | $\bar{x}$ | 1200 | | | $\bar{x}$ | 987 |
| | | R | 110 | | | R | 300 |

Note:
(1) No. is a sample number.
(2) The strength mentioned in the table is represented by the tension when the fusing part was peeled off by pulling in the axial direction of the tube the end piece and the end part of the tube material as respectively held with chucks.

Table 1 shows that the average strength $\bar{x}$ was 1200 kg in the product of the present invention but was 987 kg in the conventional product and that the fluctuation R was 110 kg in the product of the present invention but was 300 kg in the conventional product. It is found that the product of the present invention was distinctly superior to the conventional product.

I claim:
1. A method of manufacturing an improved valve moving push rod for an internal combustion engine wherein each push rod consists of a steel tube material welded by electric resistance to an end piece, said steel tube material having at one end an annular port, while the end piece has an end surface made of one of a concave or convex arcuate surface and a fixed side surface made of a flat surface, said end piece having a peripheral wall surface formed with a carbon-hardened layer, said annular port being welded to said fixed side surface of said end piece so that a cotransition boundary range including a fusing boundary surface is formed annularly about the periphery of said port at the end of said steel tube material and extends in a segmental section into said carbon-hardened layer, said method comprising the steps of:
- providing a steel tube and an end piece having a carbon hardened layer on the peripheral wall surface of said fixed side surface;
- bringing the carbon hardened layer of the fixed side surface of said end piece into contact with the periphery of the annular port of said steel tube material;
- welding said contacted members by instantaneously passing a welding current therethrough in such manner as to confine the expansion of the cotransition boundary range for both inside and outside of the tube so as to be limited within the fusing boundary layer; and
- high frequency electrically heating the contacted members simultaneously with cutting off of the welding current, thereby reducing the quick temperature drop which would otherwise be effected in the fused parts so as to inhibit the generation of cracks therein.

* * * * *